US012803359B2

(12) United States Patent
Yatsukawa et al.

(10) Patent No.: US 12,803,359 B2
(45) Date of Patent: Nov. 17, 2026

(54) INSULATOR, STATOR, AND MOTOR

(71) Applicant: Komatsu Ltd., Tokyo (JP)

(72) Inventors: Ryo Yatsukawa, Tokyo (JP); Ryo Kawai, Tokyo (JP); Yukihiko Sugimoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 198 days.

(21) Appl. No.: 18/724,017

(22) PCT Filed: Jan. 23, 2023

(86) PCT No.: PCT/JP2023/001937
§ 371 (c)(1),
(2) Date: Jun. 25, 2024

(87) PCT Pub. No.: WO2023/140380
PCT Pub. Date: Jul. 27, 2023

(65) Prior Publication Data
US 2025/0062653 A1 Feb. 20, 2025

(30) Foreign Application Priority Data
Jan. 24, 2022 (JP) ................................ 2022-008912

(51) Int. Cl.
*H02K 3/34* (2006.01)
*H02K 1/16* (2006.01)
*H02K 3/50* (2006.01)

(52) U.S. Cl.
CPC ............... *H02K 3/345* (2013.01); *H02K 1/16* (2013.01); *H02K 3/50* (2013.01)

(58) Field of Classification Search
CPC ............ H02K 3/345; H02K 1/16; H02K 3/50; H02K 3/34; H02K 3/38; H02K 3/52; H02K 3/522; H02K 3/46; Y02T 10/64
(Continued)

(56) References Cited

U.S. PATENT DOCUMENTS 2,701,317 A * 2/1955 Herman .................. H02K 3/38 310/260
3,219,857 A * 11/1965 Fisher ...................... H02K 3/50 310/71
(Continued)

FOREIGN PATENT DOCUMENTS

EP 3678284 A1 7/2020
JP 2007-020251 A 1/2007
(Continued)

OTHER PUBLICATIONS

Office Action mailed Jan. 6, 2026, issued in the corresponding Japanese patent application No. 2022-008912 and English translation thereof.

*Primary Examiner* — Charles Reid, Jr.
(74) *Attorney, Agent, or Firm* — Troutman Pepper Locke LLP; James E. Armstrong, IV; Joshua L. Jones

(57) ABSTRACT

An insulator 5 disposed between a stator core and a three-phase coil wound around the stator core includes a main body section 61 that covers a portion around which the coil is wound in the stator core and insulates the stator core and the coil, a locking section 62 disposed at an end portion on a radial direction inner side of the main body section 61, and a plurality of jumper wire holding sections 63 that are disposed a radial direction outer side of the main body section 62 and hold jumper wires of the coil. In an axial direction view, at least one of the plurality of jumper wire holding sections 63 is formed shorter in a circumferential direction on the radial direction outer side than in the circumferential direction on the radial direction inner side.

7 Claims, 12 Drawing Sheets

(58) Field of Classification Search
USPC .......................................................... 310/215
See application file for complete search history.

(56) References Cited

U.S. PATENT DOCUMENTS

| | | | | | |
|---|---|---|---|---|---|
| 3,748,512 | A * | 7/1973 | Crabb | H02K 3/325 | 310/194 |
| 4,400,639 | A * | 8/1983 | Kobayashi | H02K 3/38 | 310/214 |
| 9,024,500 | B2 * | 5/2015 | Kimura | F01D 25/08 | 310/194 |
| 2015/0084458 | A1 * | 3/2015 | Tokunaga | H02K 5/225 | 310/71 |
| 2015/0155752 | A1 * | 6/2015 | Wisnewski | H02K 3/325 | 310/215 |

FOREIGN PATENT DOCUMENTS

| | | | |
|---|---|---|---|
| JP | 2010246353 | A * | 10/2010 |
| JP | 2012-213275 | A | 11/2012 |
| JP | 5405880 | B2 | 2/2014 |
| JP | 2015-15876 | A | 1/2015 |
| JP | 5968125 | B2 | 8/2016 |
| JP | 6053647 | B2 | 12/2016 |
| JP | 2017-163726 | A | 9/2017 |
| JP | 2019-208335 | A | 12/2019 |
| JP | 6994873 | B2 | 1/2022 |

* cited by examiner 62
3
$63_1$
$63_2$
$63_3$
100
$63_4$
$63_5$ 62
3
$63_1$
$63_2$
$63_3$
100
$63_4$
$63_5$ 3
62
100
$63_1$
$63_2$
$63_3$
$63_4$
$63_5$ 3
62
100
$63_1$
$63_2$
$63_3$
$63_4$
$63_5$ 3
62
100
$63_1$
$63_2$
$63_3$
$63_4$
$63_5$

INSULATOR, STATOR, AND MOTOR

FIELD

The present disclosure relates to an insulator, a stator, and a motor.

BACKGROUND

There has been known a technique concerning a motor including a stator including a stator core and a coil, a rotor, and an insulator (see, for example, Patent Literature 1). In the technique described in Patent Literature 1, the insulator has a structure that improves cooling efficiency by cooling oil supplied to the coil wound around the stator core.

CITATION LIST

Patent Literature

Patent Literature 1: JP 2012-213275 A

SUMMARY

Technical Problem

In order to downsize the motor and improve output, it is necessary to reduce the number of poles. When the number of poles is reduced, the number of coils wound around one tooth increases. Accordingly, it is necessary to form a locking section of an insulator provided to restrict a coil from coming off larger than a locking section of the insulator of the related art. However, a path of a nozzle used when the coil is wound is likely to interfere with the locking section of the insulator as in the related art. Therefore, in the insulator, the path of the nozzle used when the coil is wound needs to be secured.

An object of the present disclosure is to provide an insulator, a stator, and a motor in which a path of a nozzle used when a coil is wound is secured.

Solution to Problem

According to an aspect of the present invention, an insulator disposed between a stator core and a three-phase coil wound around the stator core, the insulator comprises: a main body section that covers a portion around which the coil is wound in the stator core and insulates the stator core from the coil; a locking section disposed at an end portion on a radial direction inner side of the main body section; and a plurality of jumper wire holding sections that are disposed on a radial direction outer side of the main body section and hold jumper wires of the coil, wherein in an axial direction view, at least one of the plurality of jumper wire holding sections is formed shorter in a circumferential direction on the radial direction outer side than in the circumferential direction on the radial direction inner side.

According to another aspect of the present invention, a stator of a motor comprises: the insulator; the stator core to which the insulator is attached; and the coil wound around the stator core via the insulator.

According to still another aspect of the present invention, a motor comprises: the end face; and a rotor that rotates with respect to the stator.

Advantageous Effects of Invention

According to the present disclosure, there are provided an insulator, a stator, and a motor in which a path of a nozzle used when a coil is wound is secured.

DESCRIPTION OF EMBODIMENTS

In the following explanation, an embodiment according to the present disclosure is explained with reference to the drawings. However, the present invention is not limited to the embodiment. Constituent elements of the embodiment explained below can be combined as appropriate. A part of the constituent elements is sometimes not used.

First Embodiment

<Motor>

Figure 1:
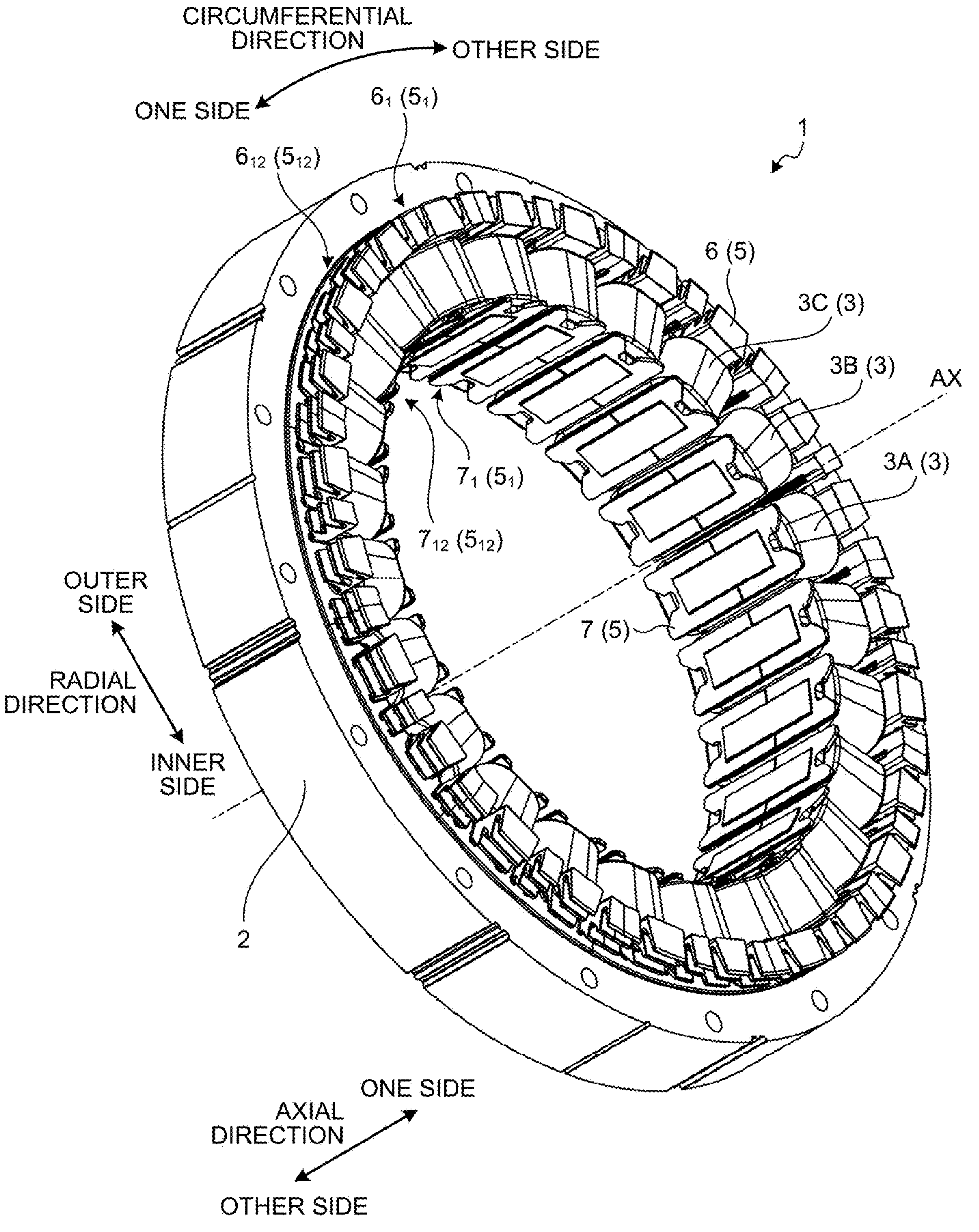
FIG. 1 is a diagram schematically illustrating a stator including an insulator according to a first embodiment.
Figure 2:
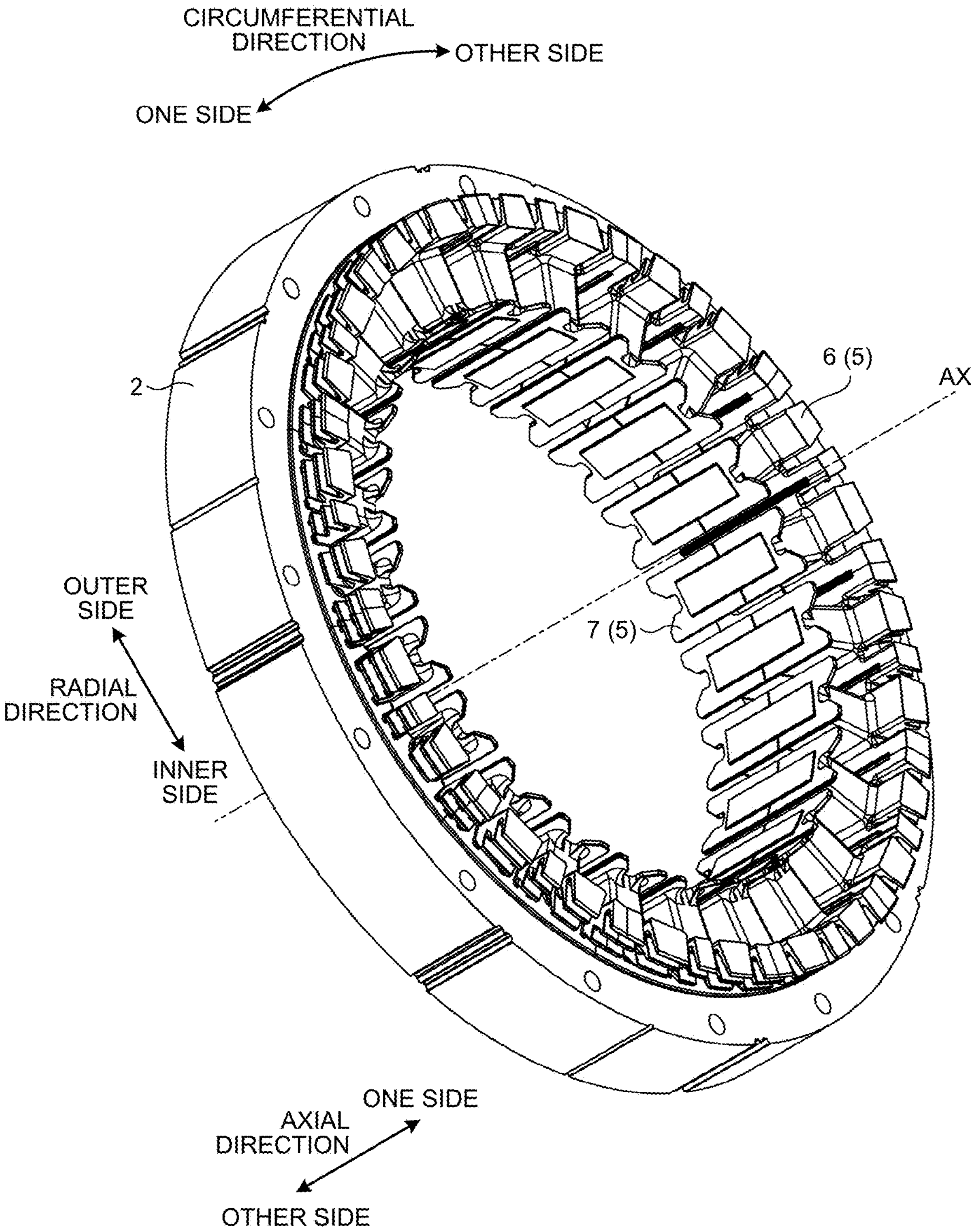
FIG. 2 is a perspective view schematically illustrating a state in which a coil is not disposed in the stator illustrated in FIG. 1.
Figure 3:
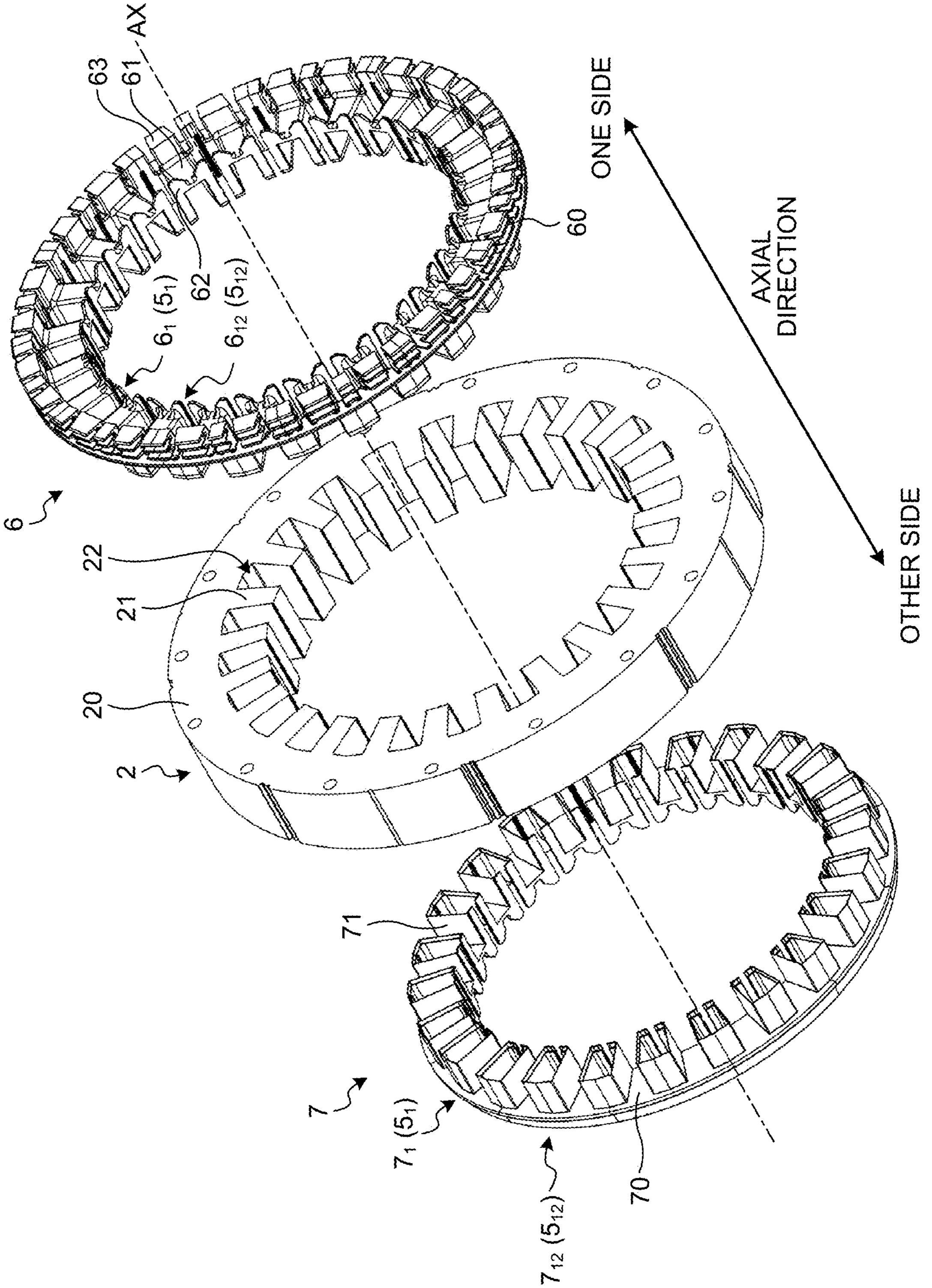
FIG. 3 is an exploded perspective view of the stator including the insulator illustrated in FIG. 2.

FIG. 1 is a diagram schematically illustrating a stator including an insulator according to a first embodiment. FIG. 2 is a perspective view schematically illustrating a state in which a coil is not disposed in the stator illustrated in FIG. 1. FIG. 3 is an exploded perspective view of the stator including the insulator illustrated in FIG. 2. In the figures, the shape of a coil 3 is schematically illustrated. The stator including the insulator is disposed in a not-illustrated three-phase 24-pole segment-type switched reluctance motor. The motor includes a cylindrical stator 1 and a not-illustrated rotor disposed on the inner side of the stator 1. The stator 1 includes a cylindrical stator core 2 and a coil 3 supported by the stator core 2. The inner circumferential surface of the stator 2 and the outer circumferential surface of the rotor face at an interval.

In the following explanation, a direction parallel to a rotation axis AX of the motor is referred to as axial direction. the axial direction one side is referred to as axial direction one side and the side opposite to the axial direction one side is referred to as axial direction other side. A direction of turning around the rotation axis AX is referred to as circumferential direction. One side in a rotating direction in the circumferential direction is referred to circumferential direction one side and the side opposite to the circumferential direction one side is referred to as circumferential direction other side. Further, a radiation direction of the rotation axis AX is referred to as radial direction. A direction side away from the central axis AX in the radial direction is referred to as radial direction outer side and the side opposite to the radial direction outer side is referred to as radial direction inner side.

<Stator Core>

The stator core 2 includes a main body section 20, teeth 21, and slots 22 that house the coil 3. The slots 22 are recesses recessed from the inner circumferential surface to the radial direction outer side. A plurality of slots 22 are provided in the circumferential direction on the inner circumferential surface of the stator core 2. In the present embodiment, twenty-four slots 22 are disposed in the stator core 2 in the circumferential direction. In the present embodiment, the number of slots of the stator 2 is twenty-four. The slots 22 extend in the axial direction. The slots 22 are disposed on the inner circumferential surface. The slots 22 are opened toward the axial direction one side, the axial direction other side, and the radial direction inner side.

The stator core 2 includes a plurality of teeth 21 disposed among the slots 22 adjacent to one another in the circumferential direction. In the present embodiment, twenty-four teeth 21 are disposed in the stator core 2 in the circumferential direction. The teeth 21 are sections around which the coil 3 is wound in the stator core 2. The teeth 21 support the coil 3. The teeth 21 are inserted into openings of the coil 3.

The coil 3 is disposed in the periphery of the teeth 21. The coil 3 is supported by the teeth 21. The coil 3 includes the openings. The teeth 21 are inserted into the openings of the coil 3. The coil 3 is attached to the stator core 2 via an insulator 5. Since the number of poles of the motor is reduced, a winding number of the coil 3 wound around one tooth 21 is larger compared with that of a 36-pole motor of the related art.

The coil 3 includes a not-illustrated coil main body section and a not-illustrated coil end portion. A portion of the coil 3 housed in the slots 22 is the coil main body section. A portion protruding from the stator core 2 in the axial direction in the coil 3 is the coil end portion.

The coil 3 is made of, for example, a linear or belt-like conductor such as a flat wire, a round wire, or a plate-like segment conductor. The coil 3 is made of a conductor disposed in a spiral shape. The coil 3 may be configured by winding one conductor in a spiral shape or may be configured by connecting a plurality of conductors in a spiral shape. A winding method and a connection method for the coil 3 are not limited.

The coil 3 includes an A-phase coil (a first-phase coil) 3A, a B-phase coil (a second-phase coil) 3B, and a C-phase coil (a third-phase coil) 3C. When it is not particularly necessary to distinguish the A-phase coil 3A, the B-phase coil 3B, and the C-phase coil 3C, the coils are described as the coil 3.

In the circumferential direction, the A-phase coil 3A and the B-phase coil 3B are adjacent to each other. In the circumferential direction, the B-phase coil 3B and the C-phase coil 3C are adjacent to each other. In the circumferential direction, the C-phase coil 3C and the A-phase coil 3A are adjacent to each other. The B-phase coil 3B is disposed next to the circumferential direction one side of the A-phase coil 3A. The C-phase coil 3C is disposed next to the circumferential direction one side of the B-phase coil 3B. The A-phase coil 3A is disposed next to circumferential direction one side of the C-phase coil 3C.

<Insulator>

The insulator 5 is formed of a member made of resin. The insulator 5 is interposed between the coil 3 and the stator core 2. The insulator 5 is divided into a plurality in the circumferential direction. In the present embodiment, the insulator 5 is divided into twelve. The insulator 5 is divided into two in the axial direction. In other words, the insulator 5 is divided into a first member 6 on one side and a second member 7 on the other side in the axial direction.

One insulator 5 divided in the circumferential direction has a double-linked structure. Since one insulator 5 divided in the circumferential direction has the double-linked structure, the A-phase, the B-phase, and the C-phase cannot be fixed. Therefore, one insulator 5 divided in the circumferential direction fixes SN winding and makes the A-phase, the B-phase, and the C-phase common.

Figure 4:
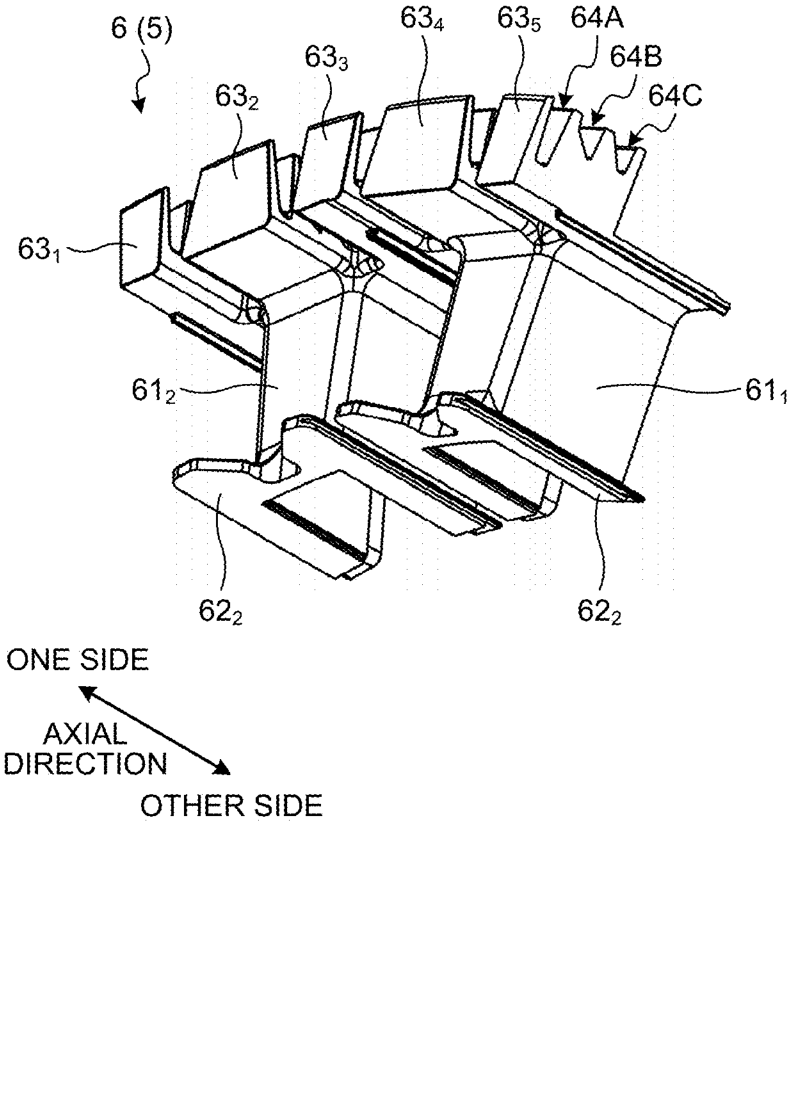
FIG. 4 is a perspective view of a first member of the insulator according to the first embodiment.
Figure 5:
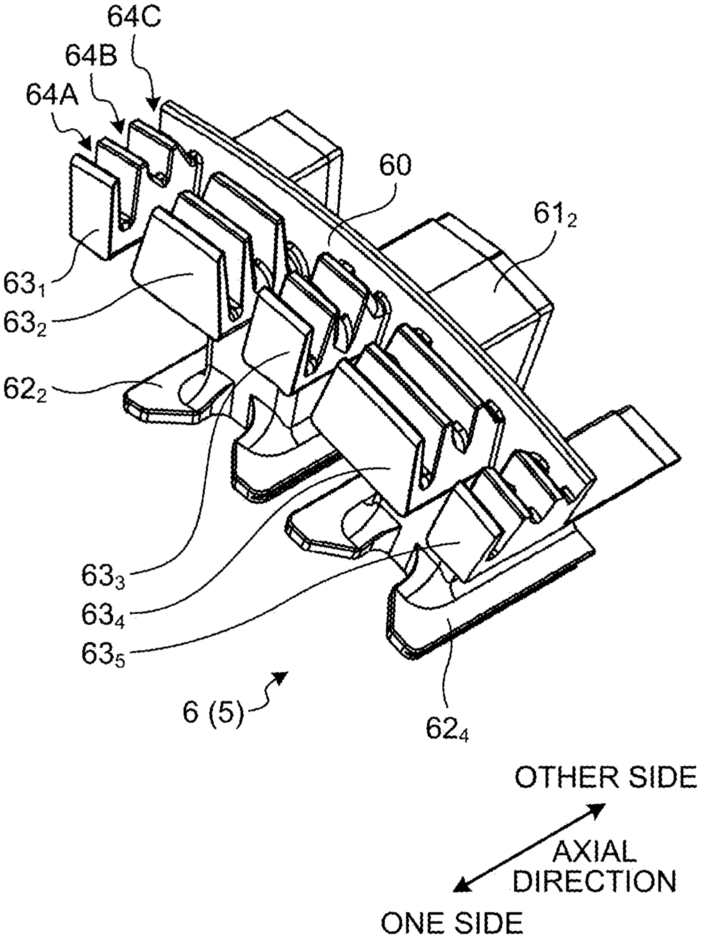
FIG. 5 is a perspective view of the first member of the insulator according to the first embodiment.
Figure 6:
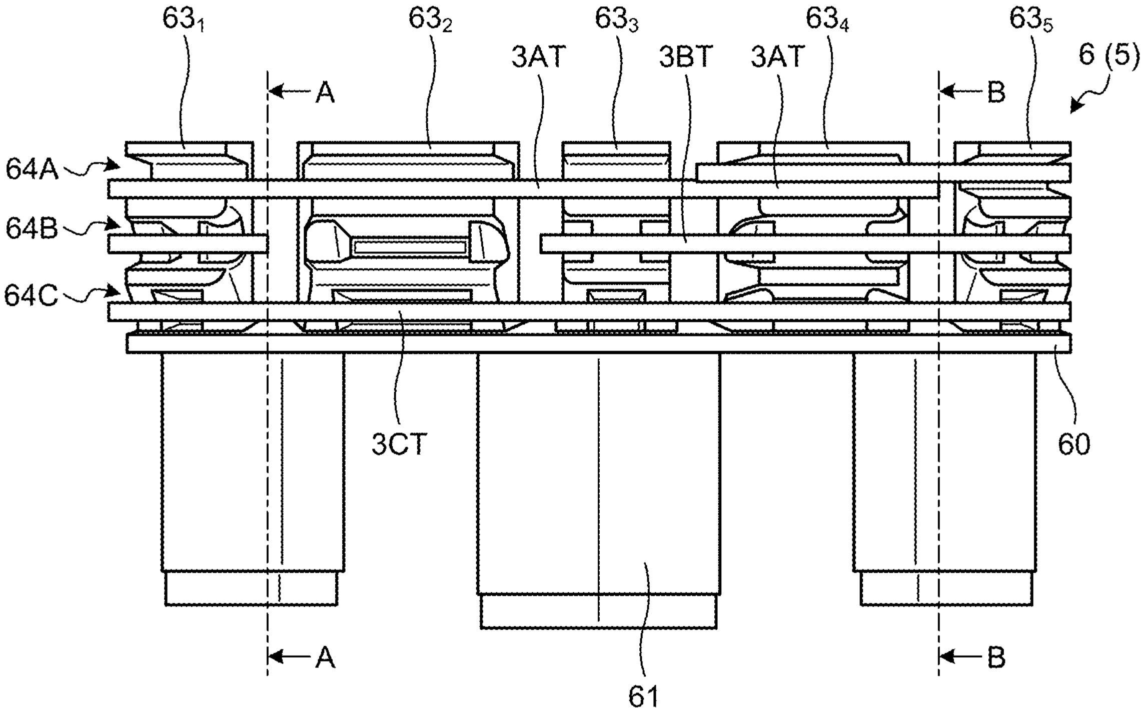
FIG. 6 is a schematic diagram of the first member of the insulator according to the first embodiment.

The first member 6 of one insulator 5 divided in the circumferential direction is explained with reference to FIG. 4 to FIG. 6. FIG. 4 is a perspective view of the first member of the insulator according to the first embodiment. FIG. 5 is a perspective view of the first member of the insulator according to the first embodiment. FIG. 6 is a schematic diagram of the first member of the insulator according to the first embodiment. FIG. 6 is a schematic diagram in which the circumferential direction is made linear for explanation. The first member 6 includes a wall section 60, a main body section 61, a locking section 62, and a jumper wire holding section 63.

The wall section 60 has a shape obtained by dividing a disk into a plurality in the circumferential direction. When all the wall sections 60 of the first member 6 of the insulator 5 divided in the circumferential direction are connected, the wall section 60 is formed in a disk shape.

The main body section 61 is protruded to the radial direction inner side from the end portion on the radial direction inner side of the wall section 60. The main body section 61 is a portion around which the coil 3 is wound. The main body section 61 is connected to an end portion on the axial direction one side of a main body section 71 of the second member 7. In a state of being assembled with the main body section 71 of the second member 7, the main body section 61 is disposed to cover the teeth 21 of the stator core 2 around which the coil 3 is wound. The main body section 61 is disposed to cover the axial direction one side of the teeth 21.

The locking section 62 restricts the coil 3 from coming off the main body section 61. The locking section 62 is longer on the axial direction one side than the main body section 61 and expands in the circumferential direction. The locking section 62 is formed higher in the axial direction higher than a locking section of the insulator of the related art. The locking section 62 is disposed on the radial direction inner side of the main body section 61. The locking section 62 is connected to the end portion on the axial direction one side of a locking section 72 of the second member 7.

The jumper wire holding section 63 holds jumper wires of the phases of the coil 3. The jumper wire holding section 63 holds a jumper wire 3AT, a jumper wire 3BT, and a jumper wire 3CT. The jumper wire holding section 63 is disposed further on the axial direction one side than the wall section 60. The jumper wire holding section 63 is disposed further on the radial direction outer side than the main body section 61.

The jumper wire holding section 63 is divided into a plurality in the circumferential direction. In the present embodiment, the jumper wire holding section 63 is divided into a jumper wire holding section $63_1$, a jumper wire holding section $63_2$, a jumper wire holding section $63_3$, a jumper wire holding section $63_4$, and a jumper wire holding section $63_5$. The jumper wire holding sections $63_1$, the jumper wire holding sections $63_2$, the jumper wire holding sections $63_3$, the jumper wire holding sections $63_4$, and the jumper wire holding sections $63_5$ are formed in different shapes. Planar shapes of the jumper wire holding section $63_1$, the jumper wire holding section $63_2$, the jumper wire holding section $63_3$, the jumper wire holding section $63_4$, and the jumper wire holding section $63_5$ are explained below. When it is not particularly necessary to distinguish the jumper wire holding section $63_1$, the jumper wire holding section $63_2$, the jumper wire holding section $63_3$, the jumper wire holding section $63_4$, and the jumper wire holding section $63_5$, the jumper wire holding sections are explained as the jumper wire holding section 63.

In the jumper wire holding section 63, a first groove 64A, a second groove 64B, and a third groove 64C are formed. The first groove 64A, the second groove 64B, and the third groove 64C are disposed to be separated in the axial direction. The first groove 64A, the second groove 64B, and the third groove 64C are formed in different shapes. The first groove 64A, the second groove 64B, and the third groove 64C have, for example, shapes different in depths in the radial direction. The first groove 64A, the second groove 64B, and the third groove 64C have, for example, shapes different in widths in the axial direction.

The first groove 64A is a groove that holds the jumper wire 3AT of the A-phase coil 3A. The first groove 64A is formed in the outer circumferential portion of the jumper wire holding section 63. The first groove 64A is opened toward the radial direction outer side. The first groove 64A is located on the axial direction one side of the jumper wire holding section 63. The jumper wire 3AT housed in the first groove 64A does not intersect the jumper wire 3BT and the jumper wire 3CT of the other phases on paths to the slots 22 of the stator core 2.

The second groove 64B is a groove that holds the jumper wire 3BT of the B-phase coil 3B. The second groove 64B is formed in the outer circumferential portion of the jumper wire holding section 63. The second groove 64B is opened toward the radial direction outer side. The second groove 64B is located further on the axial direction other side than the first groove 64A of the jumper wire holding section 63. The jumper wire 3BT housed in the second groove 64B does not intersect the jumper wire 3AT and the jumper wire 3CT of the other phases on the path to the slot 22 of the stator core 2.

The third groove 64C is a groove that holds the jumper wire 3CT of the C-phase coil 3C. The third groove 64C is formed in the outer circumferential portion of the jumper wire holding section 63. The third groove 64C opens toward the radial direction outer side. The third groove 64C is located on the axial direction other side with respect to the second groove 64B of the jumper wire holding section 63. The jumper wire 3CT housed in the third groove 64C does not intersect the jumper wire 3AT and the jumper wire 3BT of the other phase on the path to the slot 22 of the stator core 2.

In the jumper wire holding section 63 including the first groove 64A, the second groove 64B, and the third groove 64C configured as explained above, a first coil end portion of the jumper wire 3AT of the A-phase coil 3A in the first groove 64A, a second coil end portion of the jumper wire 3BT of the B-phase coil 3B in the second groove 64B, and a third coil end portion of the jumper wire 3CT of the C-phase coil 3C in the third groove 64C are present at different positions in the radial direction.

Figure 7:
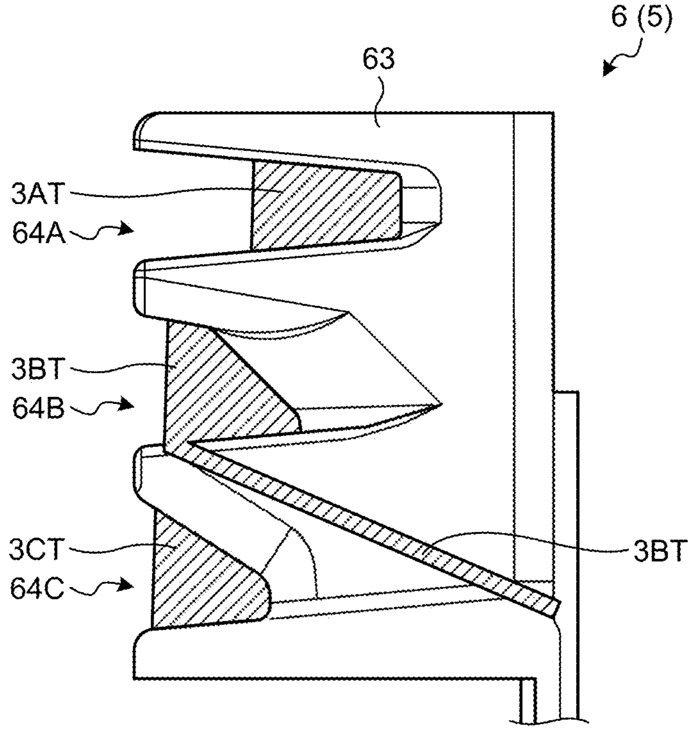
FIG. 7 is a cross-sectional view of the first member of the insulator according to the first embodiment taken along line A-A.

The jumper wire holding section 63 is explained with reference to FIG. 7. FIG. 7 is a cross-sectional view of the first member of the insulator according to the first embodiment taken along line A-A. At the position of the A-A line illustrated in FIG. 6, as illustrated in FIG. 7, the height in the radial direction of the jumper wire 3AT of the A-phase coil 3A housed in the first groove 64A is smaller than the height in the radial direction of the jumper wire 3BT of the B-phase coil 3B housed in the second groove 64B. The height in the radial direction of the jumper wire 3BT of the B-phase coil 3B housed in the second groove 64B is smaller than the height in the radial direction of the jumper wire 3CT of the C-phase coil 3C housed in the third groove 64C. At the position of the line A-A illustrated in FIG. 6, as illustrated in FIG. 7, only the jumper wire 3BT of the B-phase coil 3B housed in the second groove 64B extends to the slot 22 of the stator core 2. Accordingly, at the position of the line A-A illustrated in FIG. 6, as illustrated in FIG. 7, the jumper wire 3BT housed in the second groove 64B does not intersect the jumper wire 3AT and the jumper wire 3CT of the other phases on the path to the slot 22 of the stator core 2.

The height in the radial direction of the jumper wire 3AT of the A-phase coil 3A housed in the first groove 64A is, in other words, the height in the depth direction of the first groove 64A. The height in the radial direction of the jumper wire 3BT of the B-phase coil 3B housed in the second groove 64B is, in other words, the height of the second groove 64B in the depth direction. The height in the radial direction of the jumper wire 3CT of the C-phase coil 3C housed in the third groove 64C is, in other words, the height in the depth direction of the third groove 64C.

Figure 8:
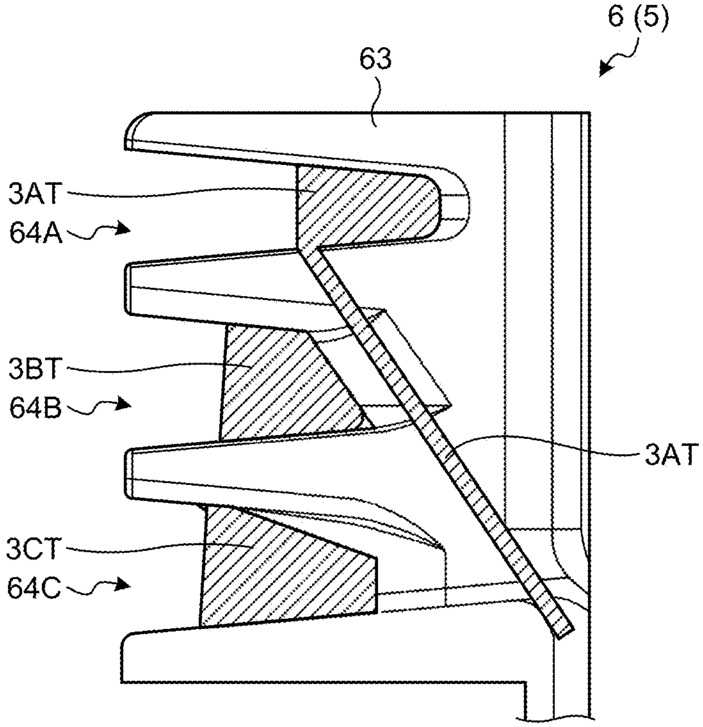
FIG. 8 is a cross-sectional view of the first member of the insulator according to the first embodiment taken along line B-B.

The jumper wire holding section 63 is explained with reference to FIG. 8. FIG. 8 is a cross-sectional view taken along line B-B of the first member of the insulator according to the first embodiment. At the position of the B-B line illustrated in FIG. 6, as illustrated in FIG. 8, the height in the radial direction of the jumper wire 3AT of the A-phase coil 3A housed in the first groove 64A is smaller than the height in the radial direction of the jumper wire 3BT of the B-phase coil 3B housed in the second groove 64B. The height in the radial direction of the jumper wire 3BT of the B-phase coil 3B housed in the second groove 64B is smaller than the height in the radial direction of the jumper wire 3CT of the C-phase coil 3C housed in the third groove 64C. At the position of the B-B line illustrated in FIG. 6, only the jumper wire 3AT of the A-phase coil 3A housed in the first groove 64A extends to the slot 22 of the stator core 2. Accordingly, at the position of the B-B line illustrated in FIG. 6, as illustrated in FIG. 8, the jumper wire 3AT housed in the first groove 64A does not intersect the jumper wire 3BT and the jumper wire 3CT of the other phases on the path to the slot 22 of the stator core 2.

Figure 9:
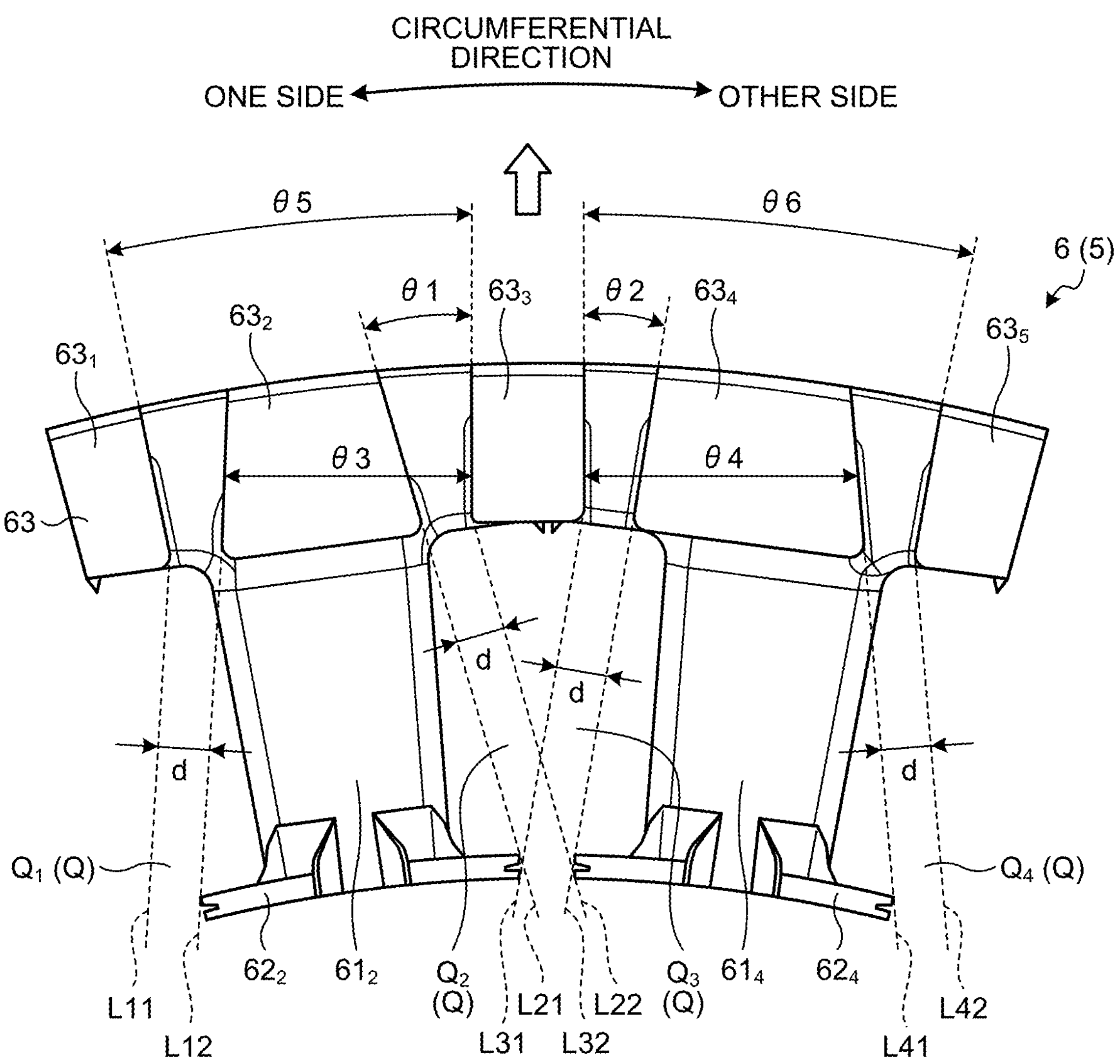
FIG. 9 is a plan view of the first member of the insulator according to the first embodiment.

A planar shape of the first member of the insulator is explained with reference to FIG. 9. FIG. 9 is a plan view of the first member of the insulator according to the first embodiment. The shape illustrated in FIG. 9 is one of a plurality of members obtained by dividing the first member 6 in the circumferential direction. In other words, the members illustrated in FIG. 9 are coupled in the circumferential direction to form the first member 6, a plane shape of which is a ring shape.

The jumper wire holding section $63_1$ is coupled to the jumper wire holding section $63_5$ of another member located next to the jumper wire holding section $63_1$ on the circumferential direction one side. The jumper wire holding section $63_5$ is coupled to the jumper wire holding section $63_1$ of another member located next to the jumper wire holding section $63_5$ on the circumferential direction one side.

The jumper wire holding section $63_2$ is located on the radial direction outer side of a main body section $61_2$. The jumper wire holding section $63_2$ is located on an axis passing the center in the circumferential direction of the main body section $61_2$. The jumper wire holding section $63_4$ is located on the radial direction outer side of a main body section $61_4$. The jumper wire holding section $63_4$ is located on an axis passing the center in the circumferential direction of the main body section $61_4$.

The jumper wire holding section $63_1$, the jumper wire holding section $63_3$, and the jumper wire holding section $63_5$ are located to deviate in the circumferential direction on the axis passing the center in the circumferential direction of the main body section $61_2$ and the axis passing the center in the circumferential direction of the main body section $61_4$. The jumper wire holding section $63_3$ is located between the jumper wire holding section $63_2$ and the jumper wire holding section $63_4$ located on the circumferential direction other side. The jumper wire holding section $63_5$ and the jumper wire holding section $63_1$ coupled to each other are located between the jumper wire holding section $63_4$ and the jumper wire holding section $63_1$ located on the circumferential direction other side.

At least one of the jumper wire holding section $63_1$, the jumper wire holding section $63_2$, the jumper wire holding section $63_3$, the jumper wire holding section $63_4$, and the jumper wire holding section $63_5$ is formed shorter in the circumferential direction on the radial direction outer side than in the circumferential direction on the radial direction inner side in the axial direction view. In the present embodiment, the jumper wire holding section $63_2$ and the jumper wire holding section $63_4$ are formed shorter in the circumferential direction on the radial direction outer side than in the circumferential direction on the radial direction inner side. Accordingly, in the jumper wire holding sections 63 adjacent to each other in the circumferential direction, the distance on the radial direction outer side is wider than the distance on the radial direction inner side. A gap extending in a direction inclined with respect to the radial direction is formed between the jumper wire holding sections 63 adjacent to each other in the circumferential direction. This gap serves as a passage Q of a nozzle 100 used when the coil 3 is wound around the stator core 2.

The passage Q of the nozzle 100 is defined, between the jumper wire holding sections 63 adjacent to each other in the circumferential direction, by a gap extending in a direction inclined with respect to the radial direction and a gap in the circumferential direction of the locking sections 62 adjacent to each other in the circumferential direction. The passage Q of the nozzle 100 is indicated by a broken line in FIG. 9. In the embodiment, the passage Q is disposed in a direction in which the center line of the passage Q intersects the radial direction.

The passage Q includes a passage $Q_1$, a passage $Q_2$, a passage $Q_3$, and a passage $Q_4$. When it is not particularly necessary to distinguish the passage $Q_1$, the passage $Q_2$, the passage $Q_3$, and the passage $Q_4$, the passages are described as the passage Q.

The passage $Q_1$ passes between the jumper wire holding section $63_1$ and the jumper wire holding section $63_2$. The passage $Q_1$ is formed between a straight line L11 and a straight line L12. The straight line L11 is a straight line connecting the end portion on the circumferential direction other side and on the radial direction inner side of the jumper wire holding section $63_1$ and the end portion on the circumferential direction other side of a locking section $62_4$ of the main body section $61_4$ located on the radial direction inner side of the jumper wire holding section $63_4$ located, on circumferential direction one side, next to the jumper wire holding section $63_5$ coupled to the jumper wire holding section $63_1$. The straight line L12 is a straight line on the extension of the end face on the circumferential direction one side of the jumper wire holding section $63_2$.

The passage $Q_2$ passes between the jumper wire holding section $63_2$ and the jumper wire holding section $63_3$. The passage $Q_2$ is formed between a straight line L21 and a straight line L22. The straight line L21 is a straight line on the extension of the end face on the circumferential direction other side of the jumper wire holding section $63_2$. The straight line L22 is a straight line connecting the end portion on circumferential direction one side and on the radial direction inner side of the jumper wire holding section $63_3$ and the end portion on the circumferential direction one side of the locking section $62_4$ of the main body section $61_4$ located on the radial direction inner side of the jumper wire holding section $63_4$ located next to the jumper wire holding section $63_3$ on the circumferential direction other side.

The passage $Q_3$ passes between the jumper wire holding section $63_3$ and the jumper wire holding section $63_4$. The passage $Q_3$ is formed between a straight line L31 and a straight line L32. The straight line L31 is a straight line connecting the end portion on the circumferential direction other side and on the radial direction inner side of the jumper wire holding section $63_3$ and the end portion on the circumferential direction other side of a locking section $62_2$ of the main body section $61_2$ located on the radial direction inner side of the jumper wire holding section $63_2$ located next to the jumper wire holding section $63_3$ on circumferential direction one side. The straight line L32 is a straight line on the extension of the end face on the circumferential direction one side of the jumper wire holding section $63_4$.

The passage $Q_4$ passes between the jumper wire holding section $63_4$ and the jumper wire holding section $63_5$. The passage $Q_4$ is formed between a straight line L41 and a straight line L42. The straight line L41 is a straight line on the extension of the end face on the circumferential direction other side of the jumper wire holding section $63_4$. The straight line L42 is a straight line connecting the end portion on circumferential direction one side and on the radial direction inner side of the jumper wire holding section $63_5$ and the end portion on the circumferential direction one side of the locking section $62_2$ of the main body section $61_2$ located on the radial direction inner side of the jumper wire holding section $63_2$ located next to, on the circumferential direction other side, the jumper wire holding section $63_1$ coupled to the jumper wire holding section $63_5$.

The passage $Q_1$ and the passage $Q_4$ intersect between the locking section $62_4$ of the main body section $61_4$ located on the radial direction inner side of the jumper wire holding section $63_4$ and the locking section $62_2$ located next to the locking section $62_4$ on the circumferential direction other side. The passage $Q_2$ and the passage $Q_3$ intersect between the locking section $62_2$ of the main body section $61_2$ located on the radial direction inner side of the jumper wire holding section $63_2$ and the locking section $62_4$ located next to the locking section $62_2$ on the circumferential direction other side.

The end portion on the circumferential direction one side of the locking section $62_2$ is located on the extension of the end face on the circumferential direction one side of the jumper wire holding section $63_2$. The end portion on the circumferential direction one side of the locking section $62_4$ is located on the extension of the end face on the circumferential direction one side of the jumper wire holding section $63_4$. The end portion on the circumferential direction other side of the locking section $62_2$ is located on the extension of the end face on the circumferential direction other side of the jumper wire holding section $63_2$. The end portion on the circumferential direction other side of the locking section $62_4$ is located on the extension of the end face on the circumferential direction other side of the jumper wire holding section $63_4$.

A space between the jumper wire holding section $63_1$ and the jumper wire holding section $63_2$, a space between the jumper wire holding section $63_2$ and the jumper wire holding section $63_3$, a space between the jumper wire holding section $63_3$ and the jumper wire holding section $63_4$, and a space between the jumper wire holding section $63_4$ and the jumper wire holding section $63_5$ are the narrowest on the radial direction inner side. A distance d of a portion where the space between the jumper wire holding section $63_1$ and the jumper wire holding section $63_2$ is the narrowest, the distance d of a portion where the space between the jumper wire holding section $63_2$ and the jumper wire holding section $63_3$ is the narrowest, the distance d of a portion where the space between the jumper wire holding section $63_3$ and the jumper wire holding section $63_4$ is the narrowest, and the distance d of a portion where the space between the jumper wire holding section $63_4$ and the jumper wire holding section $63_5$ is the narrowest are a distance that enables the nozzle 100 used when the coil 3 is wound around the stator core 2 to pass. The distance d is, for example, 6.3 mm.

In the present embodiment, in the axial direction view, an interval between the locking sections 62 adjacent to each other in the circumferential direction is, for example, 7.2 mm in the narrowest portion. In the present embodiment, in the axial direction view, an interval between the jumper wire holding sections 63 adjacent to each other in the circumferential direction is, for example, 6.3 mm or more and 6.6 mm or less in the narrowest portion.

An angle θ1 between the end portion on the circumferential direction other side of the jumper wire holding section $63_2$ and the end portion on the circumferential direction one side of the jumper wire holding section $63_3$ is, for example, 16.4°. An angle θ2 between the end portion on the circumferential direction other side of the jumper wire holding section $63_3$ and the end portion on the circumferential direction one side of the jumper wire holding section $63_4$ is, for example, 9.5°. An angle θ3 between the end portion on the circumferential direction one side of the jumper wire holding section $63_2$ and the end portion on the circumferential direction one side of the jumper wire holding section $63_3$ is, for example, 3°. An angle θ4 between the end portion on the circumferential direction other side of the jumper wire holding section $63_3$ and the end portion on the circumferential direction other side of the jumper wire holding section $63_4$ is, for example, 5°. An angle θ5 between the end portion on the circumferential direction other side of the jumper wire holding section $63_1$ and the end portion on circumferential direction one side of the jumper wire holding section $63_3$ is, for example, 11.5°. An angle θ6 between the end portion on the circumferential direction other side of the jumper wire holding section $63_3$ and the end portion on circumferential direction one side of the jumper wire holding section $63_5$ is, for example, 10.5°.

In the present embodiment, in the axial direction view, an angle formed by the end portions facing each other of the jumper wire holding sections 63 adjacent to each other in the circumferential direction is, for example, 9° or more and 17° or less.

Figure 10:
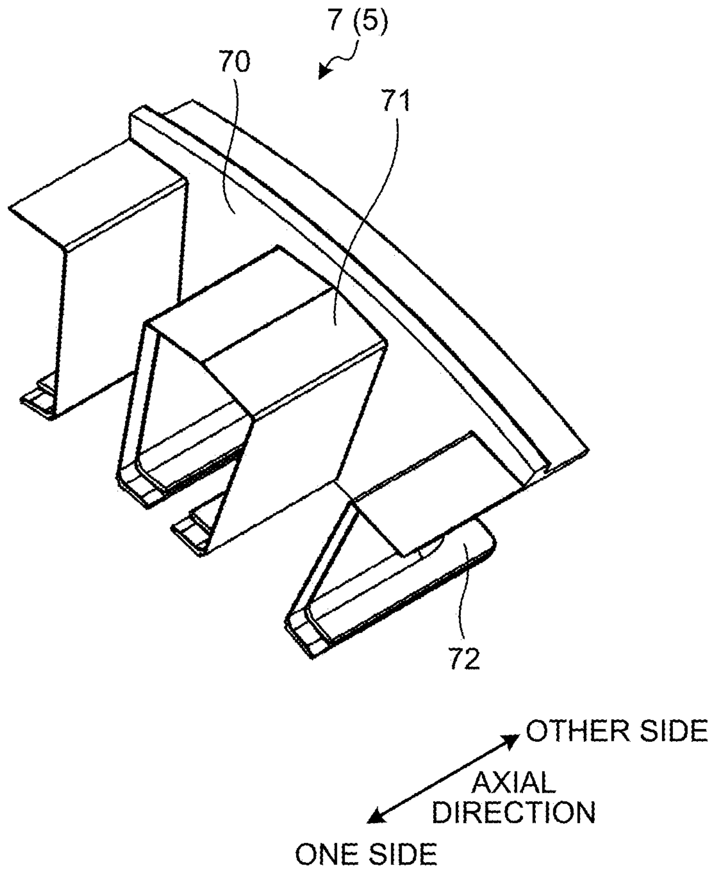
FIG. 10 is a perspective view of a second member of the insulator according to the first embodiment.
Figure 11:
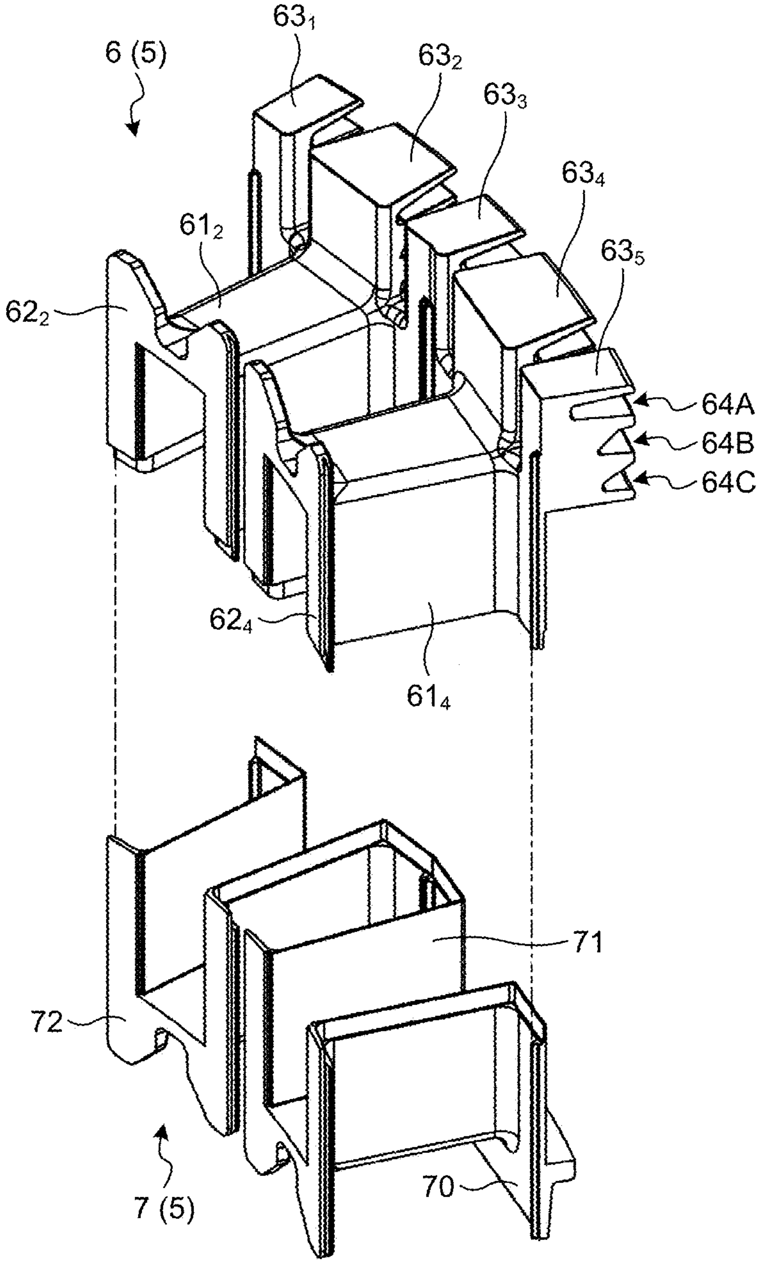
FIG. 11 is a perspective view of the first member and the second member of the insulator according to the first embodiment.

The second member 7 of one insulator 5 divided in the circumferential direction is explained with reference to FIG. 10 and FIG. 11. FIG. 10 is a perspective view of the second member of the insulator according to the first embodiment. FIG. 11 is a perspective view of the first member and the second member of the insulator according to the first embodiment. The second member 7 includes a wall section 70, the main body section 71, and the locking section 72. A shape illustrated in FIG. 10 and FIG. 11 is one of a plurality of members obtained by dividing the second member 7 in the circumferential direction. In other words, the members illustrated in FIG. 10 are coupled in the circumferential direction to form the second member 7, a plane shape of which is a ring shape.

The wall section 70 has a shape obtained by dividing a cylinder into a plurality in the circumferential direction. When all wall sections 70 of the second member 7 of the insulator 5 divided in the circumferential direction are connected, the wall section 70 formed in a cylindrical shape.

The main body section 71 protrudes to the radial direction inner side from a surface facing the radial direction inner side of the wall section 70. The main body section 71 is a portion around which the coil 3 is wound.

The main body section 71 is connected to the end portion on the axial direction other side of the main body section 61 of the first member 6. In a state of being assembled with the main body section 61 of the first member 6, the main body section 71 is disposed to cover the teeth 21 of the stator core 2 around which the coil 3 is wound. The main body section 71 is disposed to cover the axial direction other side of the teeth 21.

The locking section 72 restricts the coil 3 from coming off the main body section 71. The locking section 72 is longer on the axial direction other side than the main body section 71 and expands in the circumferential direction. The locking section 72 is disposed on the radial direction inner side of the main body section 71. The locking section 72 is connected to the end portion on the axial direction other side of the locking section 62 of the first member 6.

<Path at the Time when the Coil is Wound>

Figure 12:
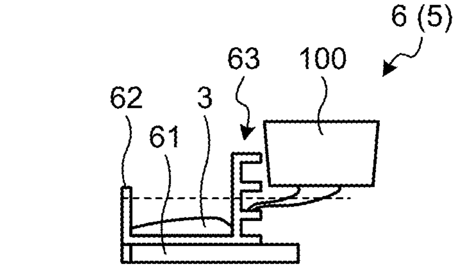
FIG. 12(*a*)-(*e*) are schematic diagrams for explaining a path of a nozzle.
Figure 12:
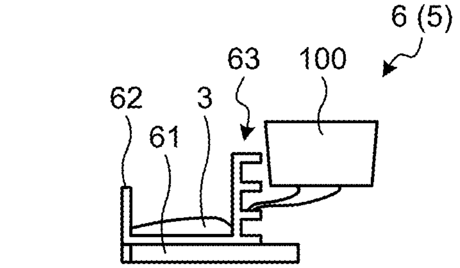
Figure 12:
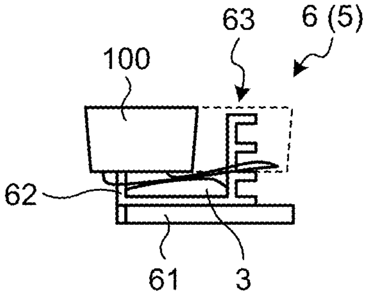
Figure 12:
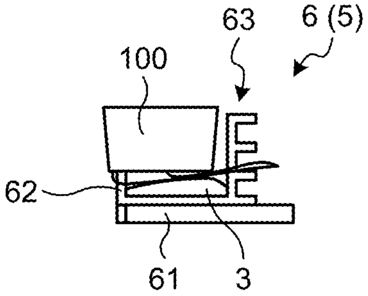
Figure 12:
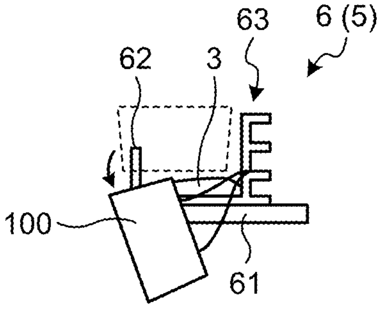
Figure 13:
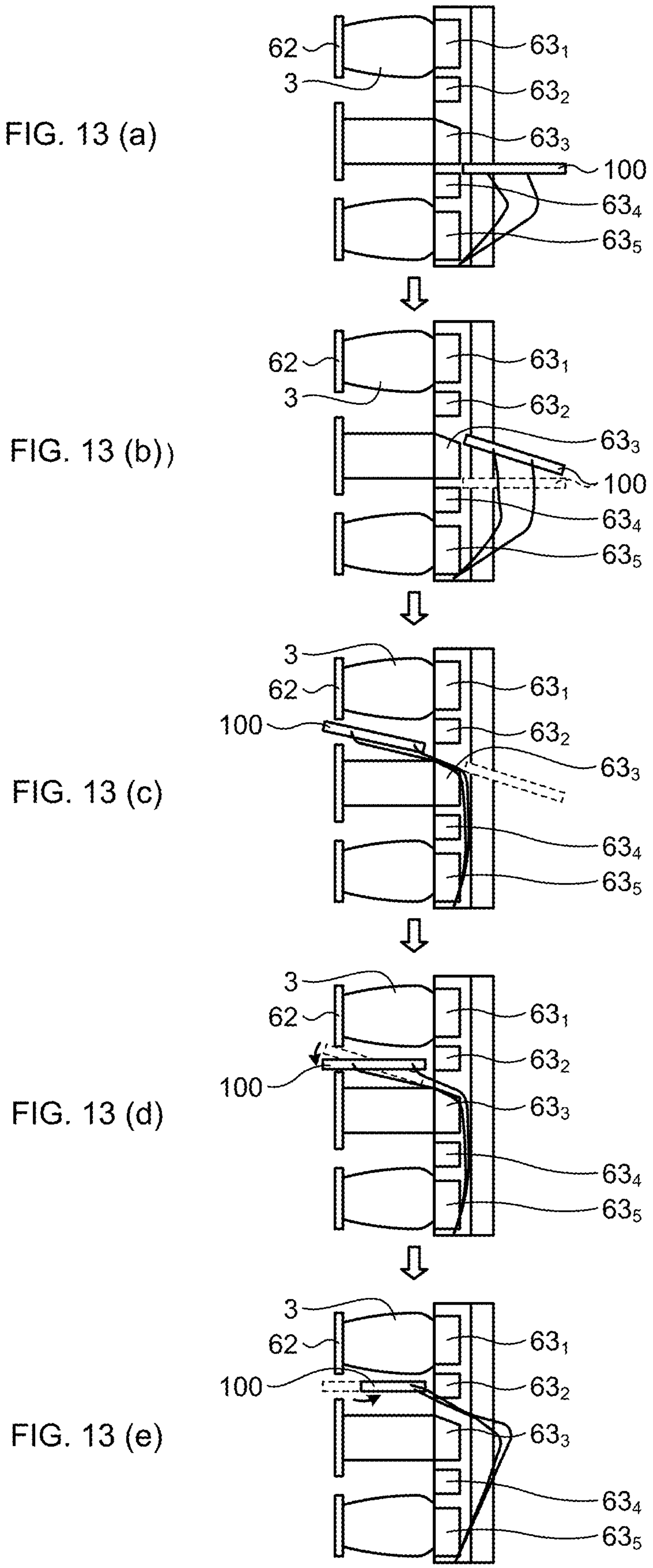
FIG. 13(*a*)-(*e*) are schematic diagrams for explaining the path of the nozzle.

A path of the nozzle 100 used when the coil 3 is wound around the stator core 2 is explained with reference to FIG. 12 and FIG. 13. FIG. 12 is a schematic diagram for explaining the path of the nozzle. FIG. 13 is a schematic diagram for explaining the path of the nozzle. FIG. 12 and FIG. 13 are schematic diagrams in which the circumferential direction is made linear for explanation. The coil 3 is wound around the integrally assembled stator core 2 using the nozzle 100.

In FIG. 12(*a*) and FIG. 13(*a*), the nozzle 100 is located in the radial direction. As illustrated in FIG. 12(*a*) and FIG. 13(*a*), the locking section 62 protrudes more greatly compared with the related art. For this reason, when the nozzle 100 enters the main body section 61 side of the insulator 6 in this state, the locking section 62 interferes with the nozzle 100.

Therefore, as illustrated in FIG. 12(*b*) and FIG. 13(*b*), the nozzle 100 is inclined obliquely to the radial direction and caused to enter the main body section 61 side of the insulator 6. As illustrated in FIG. 9, the narrowest portion between the jumper wire holding sections 63 adjacent to each other has width equivalent to a distance d that enables the nozzle 100 to pass. Therefore, the nozzle 100 can enter from this gap.

Then, as illustrated in FIG. 12(*c*) and FIG. 13(*c*), the nozzle 100 is caused to enter the locking section 62 side of the insulator 6 in a state of being kept obliquely inclined. The nozzle 100 passes between the jumper wire holding sections 63 adjacent to each other and reaches between the locking sections 62 adjacent to each other.

Then, as illustrated in FIG. 12(*d*) and FIG. 13(*d*), the nozzle 100 is returned to the direction along the radial direction. The position of the nozzle 100 is moved in order to start winding the coil 3 around the main body section 61.

Then, as illustrated in FIG. 12(*e*) and FIG. 13(*e*), the tilt of the nozzle 100 is changed to wind the coil 3 around the main body section 61.

In this way, the coil 3 is wound around the stator core 2.

Effects

In the present embodiment, in the axial direction view, at least one of the jumper wire holding sections 63 is formed shorter in the circumferential direction on the radial direction outer side than in the circumferential direction on the radial direction inner side. Accordingly, in the jumper wire holding sections 63 adjacent to each other in the circumferential direction, the distance on the radial direction outer side is wider than the distance on the radial direction inner side. A gap extending in a direction inclined with respect to the radial direction is formed between the jumper wire holding sections 63 adjacent to each other in the circumferential direction. This gap serves as a passage Q of a nozzle 100 used when the coil 3 is wound around the stator core 2. Therefore, according to the present embodiment, an operation of moving the nozzle 100 in the axial direction to avoid the locking section 62 is unnecessary regardless of the height on the radial direction inner diameter side of the locking section 62. According to the present embodiment, it is possible to simplify movement of the nozzle 100 and prevent the jumper wires from coming off.

In the present embodiment, the end portion on the circumferential direction one side of the locking section $62_2$ is located on the extension of the end face on the circumferential direction one side of the jumper wire holding section $63_2$. The end portion on the circumferential direction other side of the locking section $62_2$ is located on the extension of the end face on the circumferential direction other side of the jumper wire holding section $63_2$. In the present embodiment, the end portion on the circumferential direction one side of the locking section $62_4$ is located on the extension of the end face on the circumferential direction one side of the jumper wire holding section $63_4$. The end portion on the circumferential direction other side of the locking section $62_4$ is located on the extension of the end face on the circumferential direction other side of the jumper wire holding section $63_4$. Accordingly, the passage Q of the nozzle 100 can be secured.

As explained above, in the present embodiment, the gap extending in the direction inclined with respect to the radial direction, the gap in the circumferential direction between the locking sections 62 adjacent to each other in the circumferential direction, and the passage Q of the nozzle 100 can be secured between the jumper wire holding sections 63 adjacent to each other in the circumferential direction.

REFERENCE SIGNS LIST

1 STATOR
2 STATOR CORE
21 TOOTH
22 SLOT
3 COIL
3A A-PHASE COIL (FIRST-PHASE COIL)
3AT JUMPER WIRE
3B B-PHASE COIL (SECOND-PHASE COIL)
3BT JUMPER WIRE
3C C-PHASE COIL (THIRD-PHASE COIL)
3CT JUMPER WIRE
5 INSULATOR
6 FIRST MEMBER
60 WALL SECTION
61 MAIN BODY SECTION
62 LOCKING SECTION
63 JUMPER WIRE HOLDING SECTION
64A FIRST GROOVE
64B SECOND GROOVE
64C THIRD GROOVE
7 SECOND MEMBER
70 WALL SECTION
71 MAIN BODY SECTION
72 LOCKING SECTION
100 NOZZLE
AX ROTATION AXIS
d DISTANCE
Q PASSAGE.

The invention claimed is:

1. An insulator disposed between a stator core and a three-phase coil wound around the stator core, the insulator comprising:

a main body section that covers a portion around which the coil is wound in the stator core and insulates the stator core from the coil;

a locking section disposed at an end portion on a radial direction inner side of the main body section; and a plurality of jumper wire holding sections that are disposed on a radial direction outer side of the main body section and hold jumper wires of the coil, wherein the plurality of jumper wire holding sections includes:

a first jumper wire holding section which is disposed at a position of the main body section in a circumferential direction, in an axial direction view, a second jumper wire holding section which is disposed away from the position of the main body section in the circumferential direction, in the axial direction view, in the axial direction view, the first jumper wire holding section is formed shorter in the circumferential direction on the radial direction outer side than in the circumferential direction on the radial direction inner side, a gap extending in a direction inclined with respect to the radial direction is formed between the first jumper wire holding section and the second jumper wire holding section, in the axial direction view, a space between the first jumper wire holding section and the second jumper wire holding section is the narrowest on the radial direction inner side, wherein an end of the locking section on one side in the circumferential direction is located on an extension of an end face of the first jumper wire holding section on the one side in the circumferential direction.

2. The insulator according to claim 1, wherein, in the first jumper wire holding section, an end portion on an other side in the circumferential direction of the locking section is located on an extension of an end face on the other side in the circumferential direction of the jumper wire holding section.

3. A stator of a motor comprising:

the insulator according to claim 1;

the stator core to which the insulator is attached; and the coil wound around the stator core via the insulator.

4. A motor comprising:

the stator according to claim 3; and a rotor that rotates with respect to the stator.

5. The insulator according to claim 1, wherein, the gap serves as a passage of a nozzle used when the coil is wound around the stator core.

6. The insulator according to claim 5, wherein, the passage is disposed in a direction in which a center line of the passage intersects the radial direction.

7. The insulator according to claim 1, wherein, the plurality of jumper wire holding sections are formed in different shapes.

* * * * *